United States Patent
Cashler et al.

(10) Patent No.: US 10,234,858 B2
(45) Date of Patent: Mar. 19, 2019

(54) AUTOMATED VEHICLE CONTROL SYSTEM

(71) Applicant: APTIV TECHNOLOGIES LIMITED, St. Michael OT (BB)

(72) Inventors: Robert J. Cashler, Kokomo, IN (US); Michael I. Chia, Cicero, IN (US)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 15/490,336

(22) Filed: Apr. 18, 2017

(65) Prior Publication Data
US 2018/0299887 A1    Oct. 18, 2018

(51) Int. Cl.
G05D 1/00    (2006.01)
G05D 1/02    (2006.01)
B60W 30/18    (2012.01)
G08G 1/16    (2006.01)

(52) U.S. Cl.
CPC ..... G05D 1/0055 (2013.01); B60W 30/18163 (2013.01); G05D 1/0088 (2013.01); G05D 1/0214 (2013.01); G05D 1/0234 (2013.01); G05D 1/0257 (2013.01); G08G 1/166 (2013.01); G08G 1/167 (2013.01)

(58) Field of Classification Search
CPC .. G05D 1/0055; G05D 1/0088; G05D 1/0214; G05D 1/0234; G05D 1/0257; B60W 30/18163; G08G 1/166; G08G 1/167
USPC .......................................................... 701/26
See application file for complete search history.

(56) References Cited

U.S. PATENT DOCUMENTS

| | | | |
|---|---|---|---|
| 8,838,321 B1 | 9/2014 | Ferguson | |
| 8,880,273 B1 | 11/2014 | Chatham | |
| 9,701,307 B1* | 7/2017 | Newman | B60W 50/16 |
| 9,721,471 B2* | 8/2017 | Chen | G08G 1/167 |
| 9,734,412 B2* | 8/2017 | Tan | G06K 9/00791 |
| 9,792,509 B2* | 10/2017 | Nitschke | G06K 9/00798 |
| 2004/0016870 A1* | 1/2004 | Pawlicki | B60W 30/18 250/208.1 |
| 2004/0193374 A1* | 9/2004 | Hac | B60K 31/0008 701/301 |
| 2006/0009910 A1* | 1/2006 | Ewerhart | B60W 30/143 701/301 |
| 2010/0217476 A1* | 8/2010 | Kindo | G05D 1/0088 701/31.4 |
| 2010/0228419 A1* | 9/2010 | Lee | B60W 30/0953 701/25 |

(Continued)

FOREIGN PATENT DOCUMENTS

JP    2012 104031 A    5/2012

*Primary Examiner* — Tuan C To
(74) *Attorney, Agent, or Firm* — Lawrence D. Hazelton

(57) ABSTRACT

A vehicle-control system suitable for use on an automated vehicle includes a human-machine-interface and a controller. The human-machine-interface accepts an input from an operator of a host-vehicle. The controller is in communication with the human-machine-interface. The operator inputs a notification to the human-machine-interface. The notification indicates that the operator detects a circumstance that suggests a presence of the emergency-vehicle on the roadway that has not been detected by the system. The controller drives the host-vehicle in accordance with rules governing an operation of vehicles proximate to an emergency-vehicle stopped alongside a roadway.

6 Claims, 4 Drawing Sheets

(56) References Cited

U.S. PATENT DOCUMENTS

| | | | |
|---|---|---|---|
| 2012/0271500 A1 | 10/2012 | Tsimhoni et al. | |
| 2014/0132753 A1* | 5/2014 | Watanabe | B60R 1/00 |
| | | | 348/116 |
| 2014/0257686 A1 | 9/2014 | Feldman et al. | |
| 2015/0051780 A1* | 2/2015 | Hahne | B60W 30/09 |
| | | | 701/23 |
| 2016/0311464 A1* | 10/2016 | Yamaoka | B62D 15/0255 |
| 2017/0249839 A1* | 8/2017 | Becker | G08G 1/096725 |
| 2017/0261980 A1* | 9/2017 | Matsushita | B60W 40/09 |
| 2017/0293299 A1* | 10/2017 | Matsushita | B60R 11/04 |
| 2017/0305434 A1* | 10/2017 | Ratnasingam | B60W 40/09 |
| 2018/0053060 A1* | 2/2018 | Huang | G06K 9/00825 |
| 2018/0086341 A1* | 3/2018 | Taniguchi | B62D 6/00 |
| 2018/0088572 A1* | 3/2018 | Uchida | B60W 50/14 |
| 2018/0122259 A1* | 5/2018 | Arquero | G09B 19/167 |
| 2018/0162387 A1* | 6/2018 | Sung | G08G 1/165 |
| 2018/0259966 A1* | 9/2018 | Long | G05D 1/0214 |

* cited by examiner

AUTOMATED VEHICLE CONTROL SYSTEM

TECHNICAL FIELD OF INVENTION

This disclosure generally relates to a vehicle control system suitable for use on an automated vehicle, and more particularly relates to a vehicle control system that responds to a presence of an emergency vehicle.

BACKGROUND OF INVENTION

It is known for an automated vehicle to detect an emergency-vehicle using vision-sensors when the emergency-vehicle becomes visible to the vision-sensors. In circumstances where the emergency-vehicle is not immediately detected at the range limits of the vision-sensors, the automated vehicle may not have sufficient time to react and take appropriate actions to comply with rules protecting the safety of the emergency-vehicle personnel.

SUMMARY OF THE INVENTION

Described herein is a vehicle-control system that allows an operator of an automated vehicle to provide information to the automated vehicle via inputs through a human-machine-interface (HMI). The information enables the automated vehicle to take actions in a timely manner in the absence of sensor-data or cloud-data. With the information provided by an operator the automated vehicle may execute a predefined search for an appropriate action. As the automated vehicle comes within a sensor-range an emergency-vehicle a local-sensor may detect the emergency-vehicle and may resume autonomous driving.

In accordance with one embodiment, a vehicle-control system suitable for use on an automated vehicle is provided. The vehicle-control system includes a human-machine-interface and a controller. The human-machine-interface accepts an input from an operator of a host-vehicle. The controller is in communication with the human-machine-interface. The controller drives the host-vehicle in accordance with rules governing an operation of vehicles proximate to an emergency-vehicle stopped alongside a roadway traveled by the host-vehicle when the operator inputs a notification to the human-machine-interface. The notification indicates that the operator detects a circumstance that suggests a presence of the emergency-vehicle on the roadway ahead of the host-vehicle that has not been detected by the system.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

There may occur instances where sensors installed on an automated vehicle may not detect the presence of an emergency-vehicle (e.g. police-vehicle, ambulance, tow-truck) stopped alongside of a roadway traveled by the automated vehicle. For example, a hill on the roadway may temporarily block the emergency-vehicle from a field-of-view of the sensors, only to be detected by the sensors upon cresting the hill. The host-vehicle traveling at a speed of 112 kilometers per hour with a sensor range of 100 meters would have approximately 3.2 seconds to respond to the situation, a response time that is likely insufficient for the safety of the emergency-vehicle personnel and the comfort of occupants of the host-vehicle.

Figure 1:
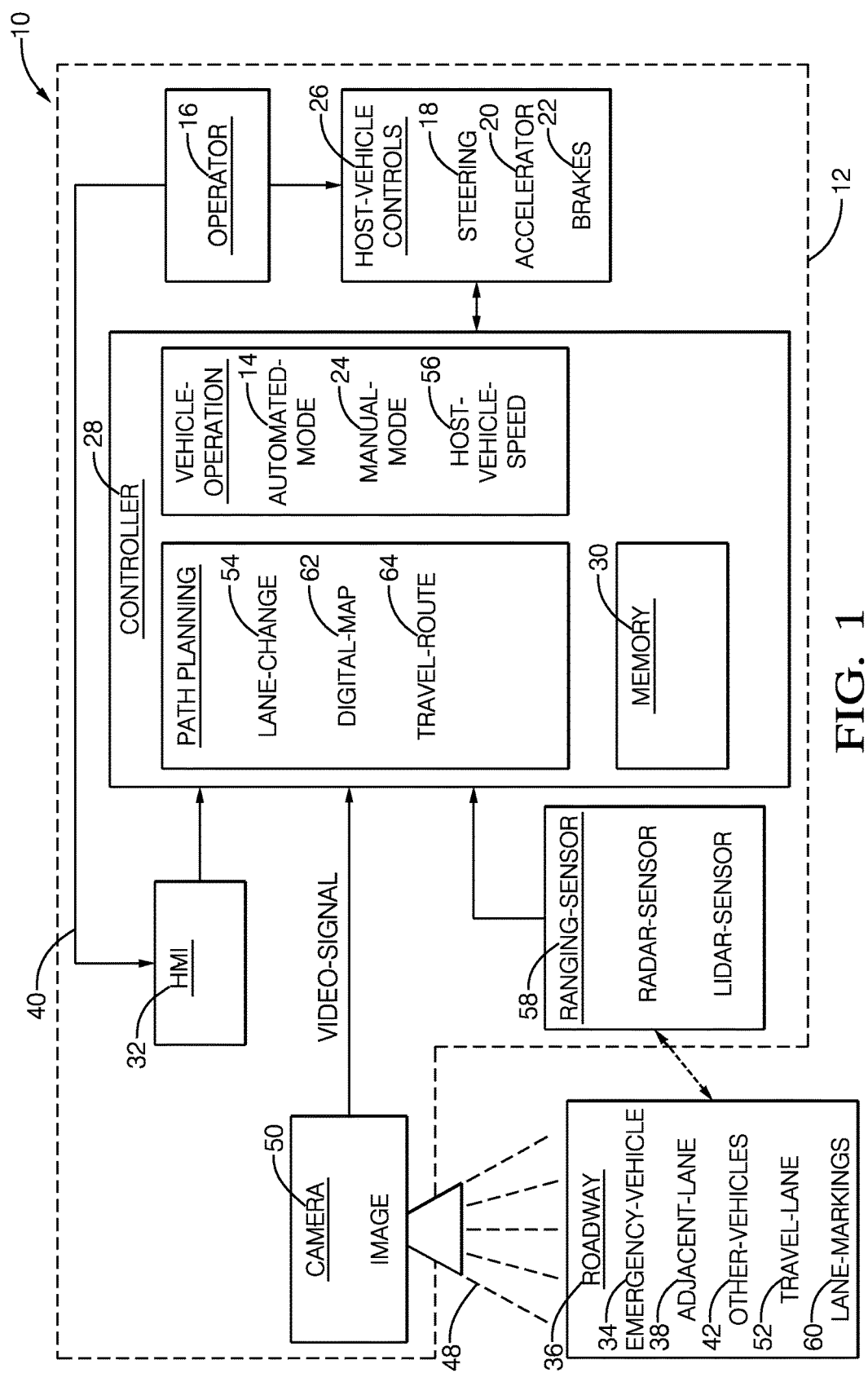
FIG. 1 is a diagram of a vehicle-control system in accordance with one embodiment.

FIG. 1 illustrates a non-limiting example of a vehicle-control system 10, hereafter referred to as the system 10, suitable for use on an automated vehicle, hereafter referred to as the host-vehicle 12. In general, the system 10 is configured to operate (i.e. drive) the host-vehicle 12 in an automated-mode 14 whereby an operator 16 of the host-vehicle 12 is little more than a passenger. That is, the operator 16 is not substantively involved with the steering 18 or operation of the accelerator 20 and brakes 22 of the host-vehicle 12. It is contemplated that the host-vehicle 12 may also be operated in a manual-mode 24 where the operator 16 is fully responsible for operating the host-vehicle-controls 26, or in a partial-mode (not shown) where control of the host-vehicle 12 is shared by the operator 16 and a controller 28 of the system 10.

The controller 28 may include a processor (not shown) such as a microprocessor or other control circuitry such as analog and/or digital control circuitry including an application specific integrated circuit (ASIC) for processing data as should be evident to those in the art. The controller 28 may include a memory 30, including non-volatile-memory, such as electrically erasable programmable read-only-memory (EEPROM) for storing one or more routines, thresholds, and captured data. The one or more routines may be executed by the processor to perform steps for operating the host-vehicle 12 based on signals received by the controller 28 as described herein.

The system 10 includes a human-machine-interface 32 (HMI 32) that accepts an input from the operator 16 of the host-vehicle 12. The HMI 32 may be any HMI 32 suitable for use in an automobile including, but not limited to, a voice-user-interface, a touchscreen-interface, a gesture-interface, a motion-tracking-interface, and a hardware-interface, as will be understood by one in the art. It will be apparent to one skilled in the art that the operator's 16 method of input will be determined by the type of HMI 32, as described above. Preferably, the operator 16 may use the voice-user interface (not shown) as the input to the HMI 32.

Figure 2:
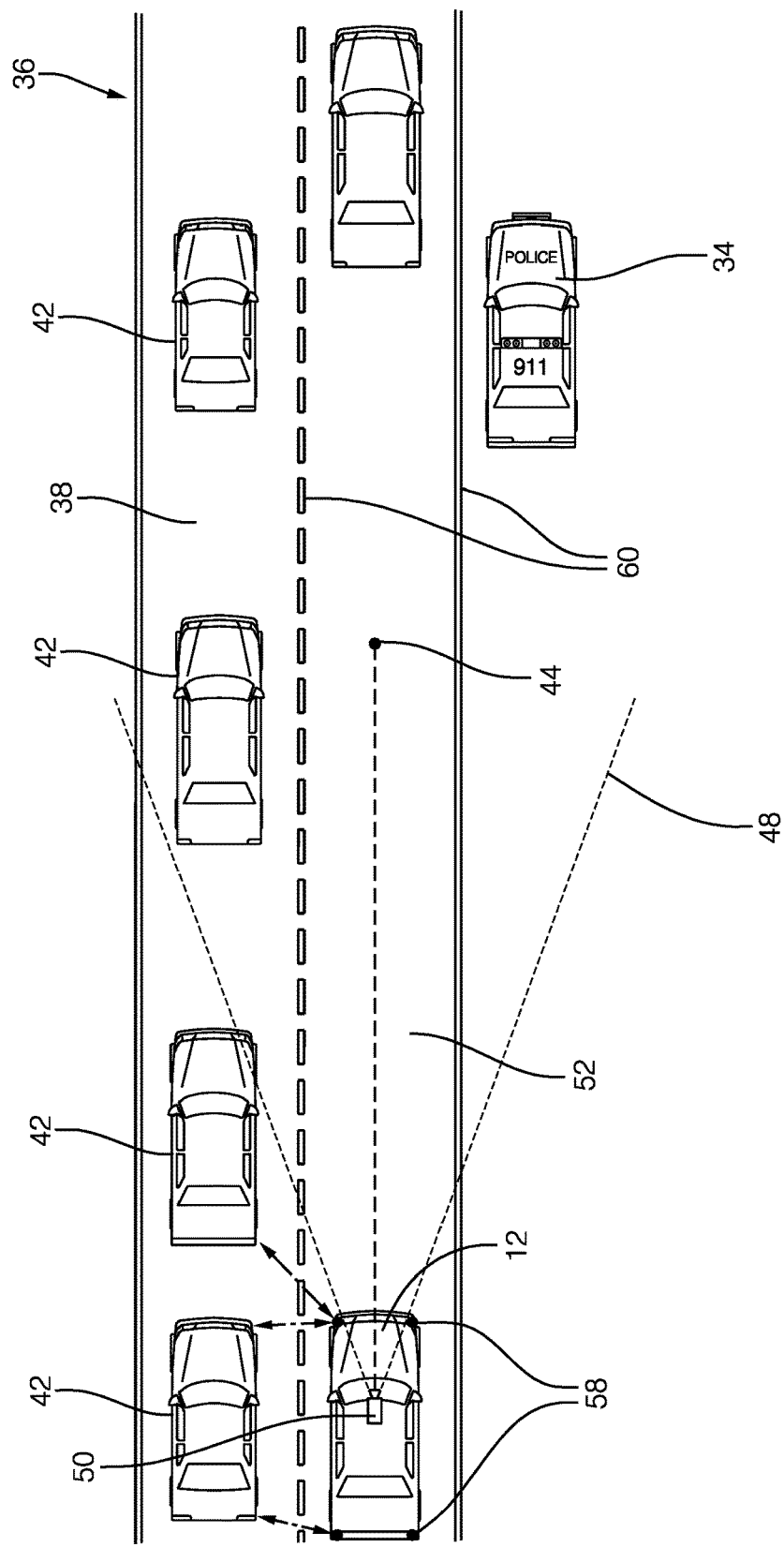
FIG. 2 is an illustration of a host-vehicle equipped with the vehicle-control system of FIG. 1 traveling in a travel-lane in accordance with one embodiment.
Figure 3:
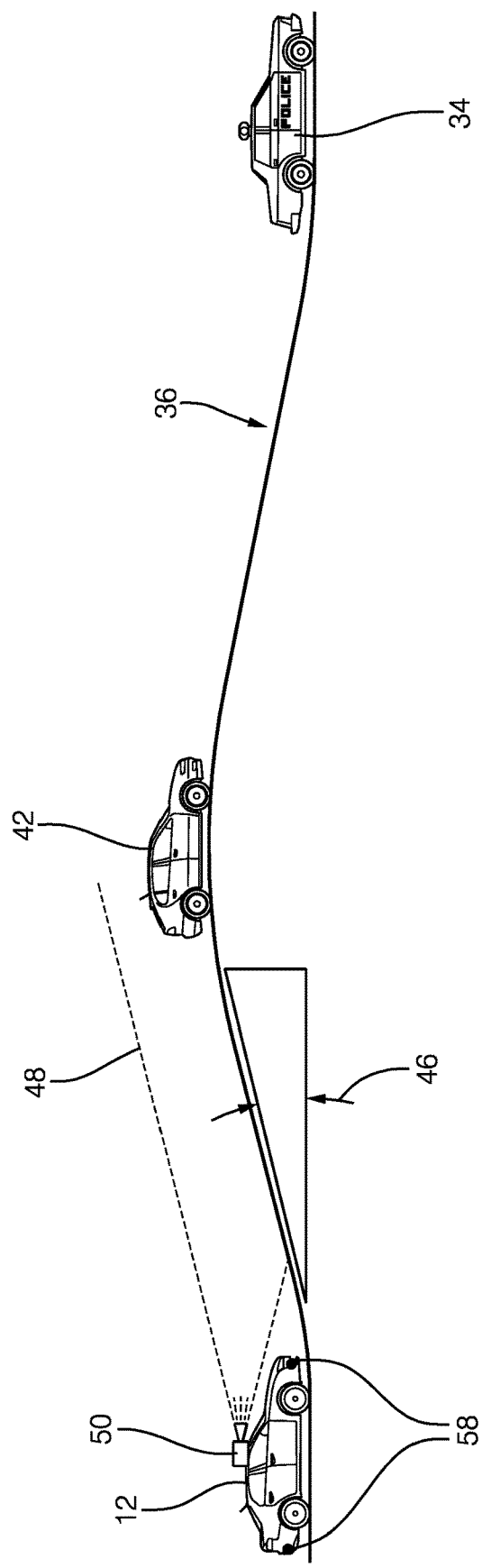
FIG. 3 is an illustration of a host-vehicle equipped with the vehicle-control system of FIG. 1 in accordance with one embodiment.

The system 10 also includes the controller 28 in communication with the HMI 32. The controller 28 may drive the host-vehicle 12 in accordance with various rules governing an operation of vehicles proximate to an emergency-vehicle 34 stopped alongside a roadway 36 traveled by the host-vehicle 12. Typically, these rules require the host-vehicle 12 to move into an adjacent-lane 38 farther away from the emergency-vehicle 34 when passing the emergency-vehicle 34. The operator 16 may input a notification 40 to the HMI 32 indicating that the operator 16 detects (i.e. sees) a circumstance (i.e. traffic-scenario, situation) that suggests (i.e. indicates to the operator 16 or is indicative of) a presence of the emergency-vehicle 34 on the roadway 36 ahead of the host-vehicle 12 that has not been detected by the system 10. The operator 16 may see brake-lights (not shown) from other-vehicles 42 ahead on the roadway 36, and/or may see the other-vehicles 42 moving into a same-lane as the suggestion of the presence of the emergency-vehicle 34, for example. As another non-limiting example, the operator 16 may see in the distance a person wearing a hat that is comparable to those commonly worn by law-enforcement officers, firemen, or emergency road-repair workers, but the system 10 may not be equipped with image processing that properly characterizes the various hats. The system 10 may not detect the presence of the emergency-vehicle 34 when the host-vehicle 12 is beyond a sensor-range 44 that may otherwise detect the emergency-vehicle's 34 flashing-lights (FIG. 2), or when a road-grade 46 or other obstruction blocks the emergency-vehicle 34 from a field-of-view 48 of a camera 50 (FIG. 3) that may be used to detect the emergency-vehicle 34, for example.

Figure 4:
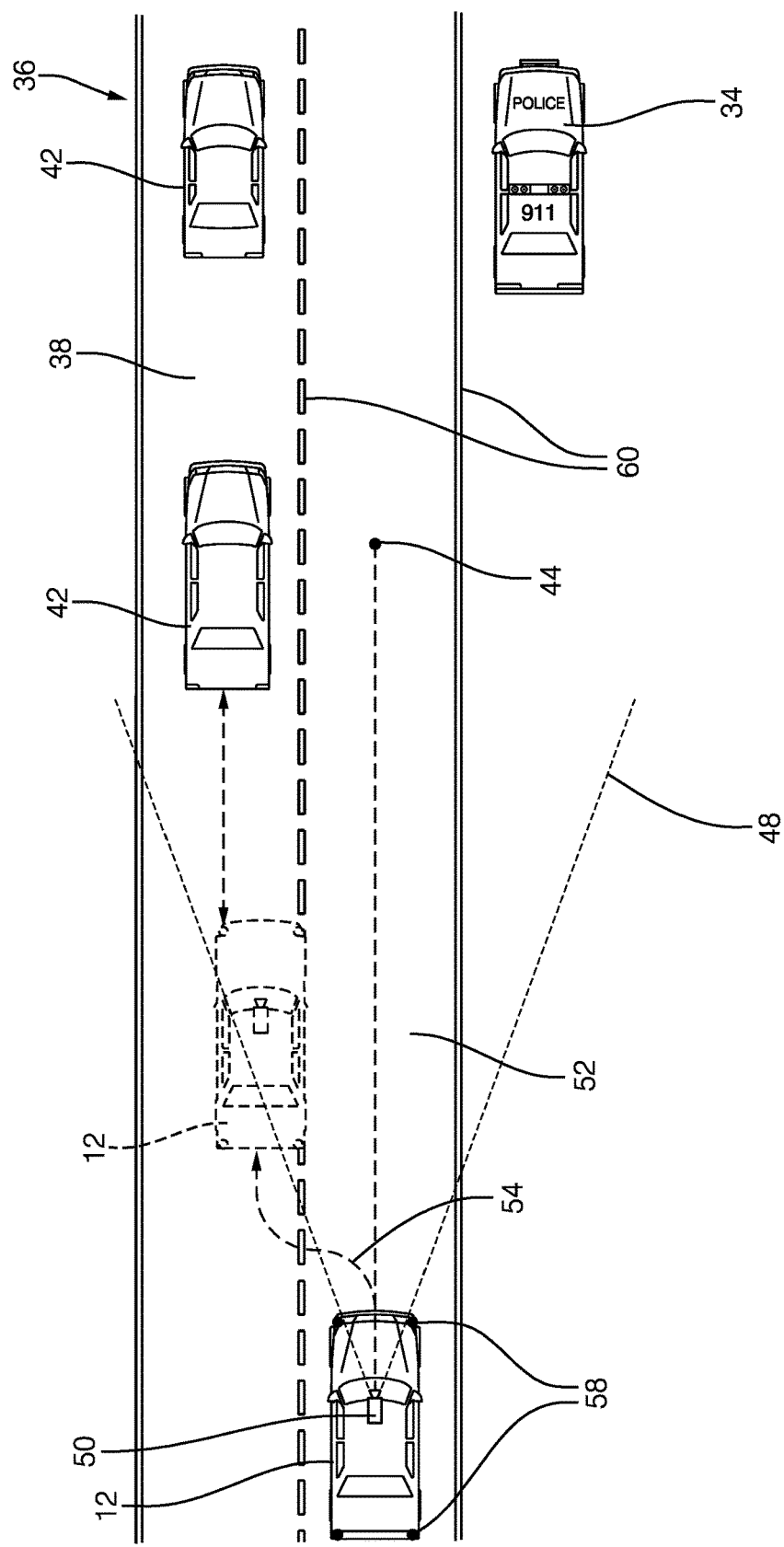
FIG. 4 is an illustration of the host-vehicle of FIG. 2 performing a lane-change.

FIG. 4 illustrates that, when the host-vehicle 12 is traveling in a travel-lane 52 adjacent to the emergency-vehicle 34, the controller 28 may determine when a lane-change 54 is allowed and drive the host-vehicle 12 into the adjacent-lane 38 farther away from the emergency-vehicle 34. The controller 28 may use sensors installed on the host-vehicle 12 to determine when the lane-change 54 is allowed, as will be described in more detail below. When the lane-change 54 is not allowed the controller 28 may reduce a host-vehicle-speed 56 (FIG. 1) and keep the host-vehicle 12 in the current travel-lane 52, and drive the host-vehicle 12 in accordance with the rules governing the operation of vehicles proximate to the emergency-vehicle 34 stopped alongside the roadway 36.

After the controller 28 drives the host-vehicle 12 into the adjacent-lane 38 farther away from the emergency-vehicle 34 and passes the emergency-vehicle 34, the controller 28 may drive the host-vehicle 12 back into the travel-lane 52 traveled by the host-vehicle 12 prior to the notification 40 when the controller 28 determines that the lane-change 54 is allowed. The controller 28 may use sensors installed on the host-vehicle 12 to determine when the lane-change 54 is allowed, as previously mentioned.

The system 10 may also include a ranging-sensor 58 in communication with the controller 28. The ranging-sensor 58 may detect the other-vehicle 42 proximate to the host-vehicle 12 (see FIG. 2). The controller 28 may further determine when the lane-change 54 is allowed based on the ranging-sensor 58 (see FIG. 4). The ranging-sensor 58 may include a radar-sensor and/or a lidar-sensor, as will be understood by one skilled in the art. Examples of the radar-sensor suitable to detect the other-vehicle 42 is an Electronically Scanning Radar (ESR) or a Rear-Side-Detection-System (RSDS), or a Short-Range-Radar (SRR) available from Delphi Inc. of Troy, Mich., USA.

The system 10 may also include the camera 50 in communication with the controller 28. The camera 50 may detect a lane-marking 60 of the travel-lane 52. The controller 28 may further determine when the lane-change 54 is allowed based on the lane-marking 60. The camera 50 may also detect the lane-marking 60 on a left-side and a right-side of the travel-lane 52. The camera 50 may detect the lane-marking 60 that is a dashed-line (not specifically shown) and may detect the lane-marking 60 that is a solid-line (not specifically shown). Typically, the dashed-line indicates that the lane-change 54 is allowed, whereas the solid-line indicates that the lane-change 54 is not allowed. Examples of the camera 50 suitable for use on the host-vehicle 12 are commercially available as will be recognized by those in the art, one such being the APTINA MT9V023 from Micron Technology, Inc. of Boise, Id., USA. The camera 50 may be mounted on the front of the host-vehicle 12, or mounted in the interior of the host-vehicle 12 at a location suitable for the camera 50 to view the area around the host-vehicle 12 through the windshield of the host-vehicle 12. The camera 50 is preferably a video-type camera 50 or camera 50 that can capture images (not specifically shown) of the roadway 36 and surrounding area at a sufficient frame-rate, of ten frames per second, for example. The controller 28 may also be configured (e.g. programmed or hardwired) to determine a centerline (not shown) on the roadway 36 for the host-vehicle 12 based on the lane-marking 60 detected by the camera 50. That is, the image detected or captured by the camera 50 is processed by the controller 28 using known techniques for image-analysis to determine where along the roadway 36 the host-vehicle 12 should be operated or be steered. Vision processing technologies, such as the EYEQ® platform from Moblieye Vision Technologies, Ltd. of Jerusalem, Israel, or other suitable devices may be used. By way of example and not limitation, the centerline is preferably in the middle of the travel-lane 52 defined by the lane-marking 60 of the roadway 36.

The system 10 may also include a digital-map 62 in communication with the controller 28. The digital-map 62 may define a travel-route 64 (FIG. 1) of the host-vehicle 12 traveling to a destination. The controller 28 may further determine when the lane-change 54 is allowed based on the digital-map 62. The digital-map 62 may be located on-board the host-vehicle 12 and may be integrated into the controller 28. The digital-map 62 may be stored 'in the cloud' and accessed via a transceiver (e.g. Wi-Fi, cellular, satellite—not shown). The digital-map 62 and transceiver may also be part of a location-device (e.g. GPS—not shown). The digital-map 62 may indicate a location of the host-vehicle 12 on the roadway 36 and indicate whether the adjacent-lane 38 is available for the lane-change 54.

Accordingly, a vehicle-control system 10, and a controller 28 for the vehicle-control system 10 is provided. The vehicle-control system 10 allows the operator 16 of the host-vehicle 12 to provide information to the host-vehicle 12 via inputs through the HMI 32 that enables the host-vehicle 12 to take actions in a timely manner when the emergency-vehicle 34 is stopped alongside the roadway 36 and not detected by sensors installed on the host-vehicle 12.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

We claim:

1. A vehicle-control system suitable for use on an automated vehicle, said system comprising:
   a human-machine-interface that accepts an input from an operator of a host-vehicle; and a controller in communication with the human-machine-interface, wherein the controller drives the host-vehicle in accordance with rules governing an operation of vehicles proximate to an emergency-vehicle stopped alongside a roadway traveled by the host-vehicle when the operator inputs a notification to the human-machine-interface indicating that the operator detects a circumstance that suggests a presence of the emergency-vehicle on the roadway ahead of the host-vehicle that has not been detected by the system, wherein the controller determines when a lane-change is allowed, wherein when the host-vehicle is in a travel-lane adjacent to the emergency-vehicle the controller drives the host-vehicle into an adjacent-lane while the lane-change is allowed, and when the lane-change is not allowed the controller reduces a host-vehicle-speed in accordance with the rules governing the operation of vehicles proximate to the emergency-vehicle stopped alongside the roadway.

2. The system in accordance with claim 1, wherein after the controller drives the host-vehicle into the adjacent-lane, and wherein after the host-vehicle passes the emergency-vehicle, and wherein when the lane-change is allowed the controller drives the host-vehicle back into the travel-lane traveled by the host-vehicle prior to the notification.

3. The system in accordance with claim 2, wherein the system further includes a ranging-sensor in communication with the controller, said ranging-sensor detects a vehicle proximate to the host-vehicle, wherein the controller further determines when the lane-change is allowed based on the ranging-sensor.

4. The system in accordance with claim 2, wherein the system further includes a camera in communication with the controller, said camera detects a lane-marking of the travel-lane, wherein the controller further determines when the lane-change is allowed based on the lane-marking.

5. The system in accordance with claim 2, wherein the system further includes a digital-map in communication with the controller, said digital-map defines a travel-route of the host-vehicle traveling to a destination, wherein the controller further determines when the lane-change is allowed based on the digital-map.

6. The system in accordance with claim 2, wherein the system further includes a ranging-sensor, a camera, and a digital-map in communication with the controller, said ranging-sensor detects a vehicle proximate to the host-vehicle, said camera detects a lane-marking of the travel-lane, said digital-map defines a travel-route of the host-vehicle traveling to a destination, wherein the controller further determines when the lane-change is allowed based on the ranging-sensor, the lane-marking, and the digital-map.

* * * * *